United States Patent [19]

Wilson et al.

[11] Patent Number: 5,228,621

[45] Date of Patent: Jul. 20, 1993

[54] APPARATUS AND METHOD FOR APPLYING MATERIAL TO AGRICULTURAL COMMODITIES

[75] Inventors: Charles L. Wilson, Frederick, Md.; Michael E. Wisniewski, Shepherstown, W. Va.

[73] Assignee: The United States, As Represented by the Secretary of Agriculture, Washington, D.C.

[21] Appl. No.: 770,806

[22] Filed: Oct. 4, 1991

[51] Int. Cl.[5] .................. B05B 1/08; B05B 7/16; B05B 12/06; B05B 15/04
[52] U.S. Cl. .................... 239/99; 239/172; 239/176; 239/288
[58] Field of Search ............... 239/99, 172, 176, 288, 239/379, 654, 661, 663; 47/1.7

[56] References Cited

U.S. PATENT DOCUMENTS

| | | | |
|---|---|---|---|
| 1,669,435 | 5/1928 | Wheeler | 239/172 X |
| 2,834,146 | 5/1958 | Bertin et al. | 239/99 |
| 2,977,715 | 4/1961 | Lindsay | 239/172 X |
| 3,666,178 | 5/1972 | Crimmins et al. | 239/172 X |
| 3,756,509 | 9/1973 | Hamnes | 239/661 X |
| 4,255,922 | 3/1981 | Hiyama et al. | 239/172 X |
| 4,274,589 | 6/1981 | Jones | 239/172 X |
| 4,893,755 | 1/1990 | Keathley | 239/172 X |
| 4,982,898 | 1/1991 | Ballu | 239/176 X |
| 5,002,227 | 3/1991 | Ehrenberg | 239/172 |
| 5,064,123 | 11/1991 | Aiello et al. | 239/99 X |

FOREIGN PATENT DOCUMENTS

| | | | |
|---|---|---|---|
| 291837 | 11/1988 | European Pat. Off. | 239/176 |
| 2606672 | 5/1988 | France | 239/172 |
| 2608944 | 7/1988 | France | 239/288 |

OTHER PUBLICATIONS

Kunkel, W. B., "The Static Electrification of Dust Particles on Dispersion into a Cloud", Journal of Applied Physics, vol. 21, Aug. 1950.

"Farm Chemicals handbook '90", Meister Publishing Co., 1990, pp. A4, 311-313.

"Becoming better neighbors", The Grower, May 1991, pp. 38 and 40.

"Electrostatic Precipitation of Pesticidal Dusts, an Outline of Research and Literature", R. D. Brazee et al., USDA-ARS-42-29, Jul. 1959, 10 pages.

*Primary Examiner*—Andres Kashnikow
*Assistant Examiner*—William Grant
*Attorney, Agent, or Firm*—M. Howard Silverstein; John D. Fado; Janelle S. Graeter

[57] ABSTRACT

The present invention is drawn to an apparatus and process for applying material, such that it is dispersed in a pulsed manner, in micronized form, to agricultural commodities, while preventing drift of the micronized material to nontargeted areas. The instant invention employs a canopy which is passed over the agricultural commodity wherein a micronizing means is used to apply material, such as a pesticide, to an agricultural commodity within the canopy. The micronized material is preferably electrostatically charged when applied to the commodity.

23 Claims, 6 Drawing Sheets

APPARATUS AND METHOD FOR APPLYING MATERIAL TO AGRICULTURAL COMMODITIES

FIELD OF THE INVENTION

This invention relates to an apparatus and process for applying material, to agricultural commodities while preventing drift of the material to nontargeted areas.

BACKGROUND OF THE INVENTION

Insects and diseases destroy billions of dollars worth of agricultural crops each year. Consequently, agricultural crops are sprayed with a wide range of materials, including pesticides, fertilizers, biological control agents, growth regulating compounds, and other materials that influence biological activity in and on the plant.

While the application of such materials is effective to a large degree for controlling insects and diseases of crops, it is still plagued with a variety of problems. One such problem is keeping the material from drifting from the targeted crops during the spraying operation. This is important because many of the materials are expensive and potentially harmful to humans and wildlife. Thus, by applying the material only onto the targeted crops, a more efficient, lower-cost application is achieved. It will also be less harmful to the surrounding environment.

Dusting materials, such as pesticides, are particularly difficult to contain in targeted areas, especially under windy conditions. Therefore, dusting of trees is generally avoided in favor of spraying an aqueous-based material which is easier to control under such conditions.

Attempts have been made to apply materials such as pesticides to only targeted areas. For example, an article titled, "Becoming Better Neighbors," The *Grower,* May 1991, pgs. 38–40, discloses an apparatus described as an "over-the-row" system. Hydraulic nozzles spray pesticides in an aqueous solution directly into trees with a hood containing the spray. Catch basins at the bottom of the apparatus catch any run-off, which is then filtered and recycled. Such an apparatus is designed for applying liquids—not dust or powders.

Most efforts to improve the efficiency of dust pesticide applications have involved the use of electrostatic forces. Briefly, this involves the placement of electrical charges (positive or negative) on the dust particles, with subsequent dependence upon an electric field (the precipitating field) to drive the particles onto the plants. Various particle-charging have been tried; e.g., friction; corona-discharge dust nozzles; and charging in the precipitating field itself. See "Electrostatic Precipitation of Pesticidal Dusts, An Outline of Research and Literature," by R. D. Brazee and W. F. Buchele, *Agricultural Research Service,* ARS-42-29, July 1959.

While efforts have been made in the past with varying degrees of success for containing pesticides, and the like, in only targeted areas, there still remains a need in the art for more efficient and effective methods; particularly for the application of dusts.

SUMMARY OF THE INVENTION

It is an object of the present invention to provide an apparatus capable of applying material, such as a pesticide dust, primarily to a targeted agricultural commodity with minimum drift to nontargeted areas (thereby reducing soil, air, and water contamination).

It is also an object of the present invention to apply materials which are typically difficult to solubilize.

It is another object of the present invention to provide an apparatus capable of applying a material to an agricultural commodity, such as a growing crop, under windy and/or rainy conditions.

Another object of the present invention is to provide a relatively low-cost apparatus which is capable of applying a material to an agricultural crop with improved coverage but with overall reduced amounts of material.

Yet another object is to apply materials to plant surfaces without having to use water as a carrier, thereby conserving water and avoiding transporting and handling of water and/or water based mixtures.

It is another object of the instant invention to permit application to agricultural commodities of unique materials, such as silica for insect control, freeze dried preparations of biocontrol agents, etc.

Another object of the present invention is to provide greater safety to personnel involved with applying materials to agricultural commodities, by avoiding any need to mix or handle the material(s) to be applied.

Yet another object of the instant invention is to provide such application of material to agricultural commodities, at low cost by virtue of: (1) requiring only a relatively small initial investment, and; (2) requiring only relatively small maintenance costs.

Also, the present invention, as it permits use of a light weight device and avoidance of use of water, avoids undesirable soil compaction which is attendant with use of water based systems.

Further, it is an object of the present invention to provide such application of material in a manner which may easily be automated.

Also, the present invention may provide the highly advantageous and unexpected results of: reducing the amount of material required for effective treatment, and improving the coverage of the agricultural commodity with the material.

These and other objects of the instant invention, which will become readily apparent from the ensuing description, are accomplished by an apparatus comprising: a canopy, defining therein an interior dimensioned to at least partially contain an agricultural commodity; micronizing means for micronizing material to be applied to the agricultural commodity in the interior of the canopy, including container means for containing material to be applied to the agricultural commodity and dispersing means which is operably connected to the container means for receiving the material from the container means and for dispersing the material to the interior of the canopy; compressor means for compressing air; pneumatic conduit means, operably connected to both the compressor means and the micronizing means, for conducting the compressed air from the compressor means to the micronizing means, and; mobile support means for supporting and transporting all of the aforementioned elements.

In a preferred embodiment of the present invention, the micronizing means is capable of producing a micronized dust having an electrostatic charge.

The present invention is also directed to a method of applying material to an agricultural commodity using the aforementioned apparatus.

BRIEF DESCRIPTION OF THE DRAWINGS

FIG. 1 hereof is a perspective view of a preferred apparatus of the present invention being pulled by a farm tractor over a row of fruit trees wherein material is being applied to said trees.

DETAILED DESCRIPTION OF THE INVENTION

Materials which can be used with the apparatus of the present invention include materials which are in the form of a powder or dust, an aqueous solution, a slurry, or in any other particulate form. It is preferred to use a material in dry particulate form. These materials, which are to be applied to the agricultural commodity are sometimes referred to herein as application materials. Typically, materials, such as pesticides, which are in powder form are comprised of carrier particles containing the pesticide material, or any other chemical treating agent for the crop. The material, or agent, can be contained on the outer surfaces of the carrier and/or within its pore structure in the case of porous carriers. Typical carriers which can be used for the application materials of the present invention are any carrier material suitable for such use. Non-limiting examples of such carriers include diatomaceous earth, alumina, silica, clays, other suitable inorganic oxides, and powdered carbohydrates such as corn starch, dextrans, and cellulose.

Non-limiting examples of application materials which can be used with the apparatus of the present invention includes pesticides, fungicides, fertilizers, biological control agents, growth regulating compounds, and other materials that influence biological activity in and on the plant.

The apparatus of the present invention has many advantages over conventional application of materials to agricultural commodities. For example, materials can be applied under windy and rainy conditions; improved coverage of plant surfaces can be achieved; there is less contamination of soil, air, and water; water is not necessary; it allows the use of materials which are difficult, or impossible, to solubilize; it allows the application of unique materials (e.g. silica for insect control and freeze dried preparations of biocontrol agents); less material is needed for effective coverage; conditions are safer for the applicator; and it avoids the hazards associated with the mixing and handling of the materials to be applied.

Figure 1:
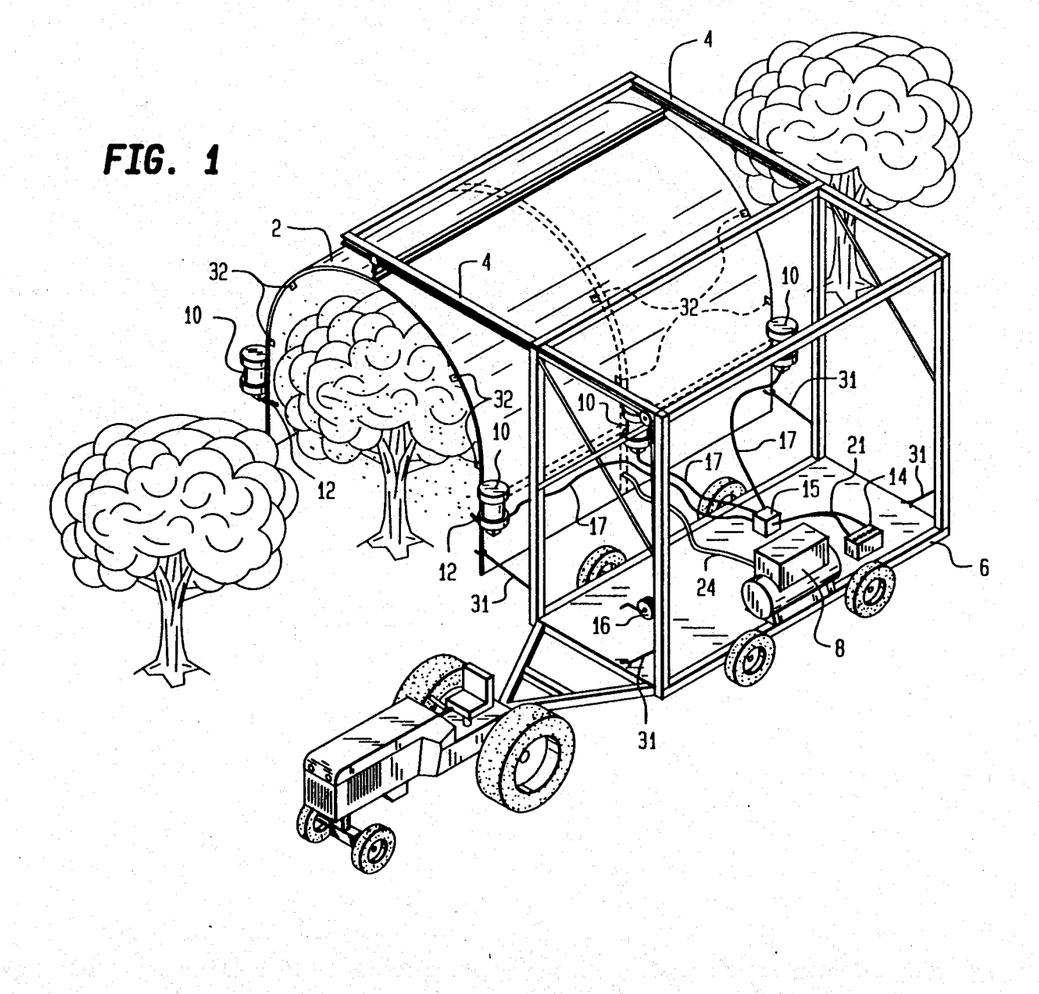

Turning now to FIG. 1, a preferred apparatus of the present invention is shown in operation being pulled by a farm tractor over a row of fruit trees. The apparatus is comprised of a canopy 2, suspended from supporting structure 4 which is secured to mobile support means (e.g. platform) 6. As illustrated, the canopy may be semicircular in cross-section and dimensioned to contain several full size mature orchard trees, for example, the canopy may be semicircular and about 15 feet in height and about 15 feet in width. It may be preferable to make the canopy even larger, e.g. 20 feet high by 20 feet wide, in order to accommodate larger agricultural commodities, such as standard size trees. A conventional air compressor means 8 functions to compress air. The air is conducted via appropriate pneumatic conduit means (e.g. air hose 24), and optionally via at least a portion of the canopy framework, to an operably connected micronizing means. The micronizing means includes: a series of container means 10 positioned on the exterior of the sides of the canopy 2 for containing the material to be applied to the agricultural commodity, e.g. trees; and a series of dispersion means 12 operably connected to said container means and directed into the interior of both sides of the canopy. There is also shown a battery 14 in electrical connection via wires 21 with an electrical switching means 15 which is in electrical connection via wires 17 with a valve means e.g. a solenoid valve (not shown) for each container. It is preferred that the electrical switching means be a pulsing switching means for permitting pulses of electricity to flow from the battery 14 to each of the solenoid valves, so that each of the solenoid valves opens and closes in a pulsed manner, thereby dispersing the material in pulses. This pulsing action enhances the overall dispersion of material.

The canopy and supporting means may be of any suitable size depending on the agricultural commodity to be treated. While it is preferred that the agricultural commodity to be treated be a growing crop, harvested commodities may also be treated. A canopy whose sides do not extend completely to the ground is versatile in that it can be lowered from the top of the structure during the treatment of lower lying crops. Of course, the sides of the canopy should not be so high off of the ground that excessive drift of material occurs from under the canopy. In fact, a preferred canopy is one which is high enough off the ground to be retracted into the supporting structure by cable and pulley system 16.

The canopy may be of any suitable construction. For example, it may be comprised of a cover, e.g. a flexible, or fabric-like material, over a support means (i.e. a rigid framework). The framework can be of any suitable material and arrangement, such as a construction of horizontal and vertical tubular members which are either permanently connected or detachably connected. The framework members will preferably be comprised of a lightweight material such as a polymeric material, a metallic material such as aluminum, although heavier metallic materials, such as iron or steel may be used. It is also within the scope of the present invention that the framework members be made out of wood. Preferred are tubular members, most preferably iron, steel, or aluminum pipe. One reason tubular members are preferred is that at least a portion of the canopy framework can also serve as part of the penumatic conduit means for passing compressed air from the air compressor means 8 to the micronizing means.

The cover may be any suitable material. It is preferred that the cover be transparent or translucent so that the operation of the device, and the position of the device in relation to the agricultural commodity, may be readily observed. Non-limiting examples of such materials include cotton or rayon cloth, or a polymeric material such as nylon and "rip-stop" plastic. Preferred is "rip-stop" plastic.

The apparatus of the present invention is operated by pulling the apparatus so that the canopy passes over the agricultural commodity to be treated. In FIG. 1, the agricultural commodity is represented by a row of fruit trees. As the canopy passes over the trees, the compressor is operated and compressed air is sent through a suitable pneumatic conduit means to the micronizing means at the canopy. The compressed air, on its way to the dispersion means of the micronizing means, siphons material from the container means 10 and causes it to be dispersed within the interior of the canopy 2. Enough pressure should be employed to adequately siphon, preferably by a venturi effect, an effective amount of material from the container means. The number of micronizing means will depend on such things as the size of the canopy, the material being applied, and the crops to be treated. FIG. 1 illustrates the use of six micronizing means, three on each side of the canopy.

The dispersion means can be of any suitable design for dispersing the material within the canopy. Typically, the dispersion means will be a so-called "sandblast gun" and will consist of a nozzle which is capable of effectively dispersing the material in a predetermined pattern. A suitable dispersion means is one comprised of a metallic body with a ceramic insert having an orifice of appropriate size for expelling the micronized material. Preferably, the dispersion means will have an orifice small enough to micronize the material, preferably as a powder, or dust, as it is expelled from the dispersion means. More preferably, the dispersion means is one which will cause the micronized dust to become electrostatically charged while it is expelled from the nozzle. This is typically done by making the orifice small enough so that friction forces on the powder or dust particles, as they are expelled from the dispersion means, will cause the particles to become electrostatically charged. This is advantageous because the charged powder particles will repel each other because they will all be of like charge. Thus, agglomeration of the powder is avoided and a more effective dispersion is produced. The electrostatically charged particles will be attracted to the crop, because the crop will have a charge which is opposite to that of the powder particles. Therefore, loss of dispersed material is minimized. Examples of dispersion means useable in the present invention include conventional commercially available sandblast guns. Examples include sandblast guns listed in the "Thomas Register of American Manufactures and Thomas Register Catalog File" available from Thomas Publishing Company, One Penn Plaza, New York, N.Y.

Further, it is preferred that the dispersion means be pointed toward the front end of the canopy. That is, the end of the canopy in the direction of forward movement of the apparatus. By directing the dispersion of material in this way, substantially all of the dispersed material can be contained in the interior of the canopy and applied to the agricultural commodity. Optionally, curtain means may be provided at the opening at either or both ends of the canopy to deter escape of the material through the openings. More specifically, the curtain means may take the form of an air curtain positioned above either or both openings. Air curtains useable in the present invention include, for example Fli-Dor TM manufactured by Air Economy Corp., Flemington, N.J., as described in the Thomas Register, supra. Such an air curtain is illustrated in FIG. 5 as element 33. It should be understood that an air curtain may be provided at each end of the canopy. Alternatively, the curtain means may take the form of a flexible physical barrier, such as a series of about 8 to 12 inch wide strips of essentially impervious material such as cotton or rayon cloth, or a polymeric material such as nylon. Such strips may be suspended from the ends of the canopy, side-by-side or overlap, so as to enclose the ends of the canopy. Preferred is rip-stop nylon. Such a flexible physical barrier is illustrated in FIG. 6, generally as element 34. The barrier illustrated in FIG. 6 includes a bar/rod 35 from which is suspended a plurality of strips 36, extending downward to about the bottom of the canopy.

The air compressor means 8 may be any suitable conventional air compressor, preferably gasoline powered, which will be effective for the volumes and pressures needed for operating the apparatus of the present invention. The particular volumes and pressures employed will be dependent on such things as the number of nozzles arranged within the canopy, the inside diameter of the conduit means, the size of the orifice of the nozzles, and the overall volume of the canopy. Typical volumes within the canopy will range from about 1,000 to 8,000 $ft^3$, preferably from 3,000 to 6,000 $ft^3$, and typical pressures will be at least about 95 psig, e.g. from about 100 to 200 psig, preferably from about 120 to 150 psig, based on a canopy which is about 15 ft. high and 14 ft. wide. An example of an air compressor means useable in the present invention is the Wayne T5223RGC7, eleven horsepower, gasoline engine driven air compressor available from Dresser Industries, Sidney, Ohio.

FIG. 2 is an end view of the apparatus of FIG. 1. The various apparatus elements shown in FIG. 2 correspond to those shown in FIG. 1 consequently those elements described in regard to FIG. 1 above, need not be further described here. As shown more clearly in FIG. 2 the canopy 2 may be moved from side to side using the cable and pulley means 16 (i.e. from a first position which is substantially over mobile support means (platform) 6 to an extended position beside the mobile support means (platform) 6. The canopy being shown in the extended position in FIGS. 1 and 2. The canopy is shown as being suspended by two rollers which ride on rails. Cables are attached to the canopy and run via pulleys to means for pulling the cable (e.g. as illustrated in FIGS. 1 and 2, a spool with a hand crank). Such means may be used for motivating movement of the canopy from the extended position to a retracted position, and vice versa. Also, such means may permit the canopy to be moved by gravitational or mechanical force from a first position to a second position (e.g. from the retracted position to the extended position), and motivate movement of the canopy in the opposite direction. The present invention also encompasses means to lock the canopy in either its first retracted position or its second extended position, such as by virtue of a locking means (31), which consists of a rigid (e.g. metal) pole that traverses between the supporting structure and the canopy, and attaches to the canopy via a removable metal pin. The cable and pulley means 16 may be hand operated or motor-driven. The dispersion means are shown on the interior of both sides of the canopy. Provision of an array of quick connection means 32 allows the positioning of the dispersion means 12 in a variety of configurations within the canopy, for optimum dispersion. The dispersion means 12 may be moved easily and rapidly from one position to another, by disconnection from one quick connection means 32 and connection to another quick connection means 32. Another arrangement would be to have the dispersion means at the sides of the interior of the canopy as well as on the interior top pointing downward. Any number of dispersion means can be arranged within the canopy, but it is preferred to include only an effective number. That is, the minimum number required to effectively apply a predetermined amount of material to the targeted agricultural commodity. Typically, dispersion means will only be used along the sides of the canopy, the same number on each side.

Figure 2:
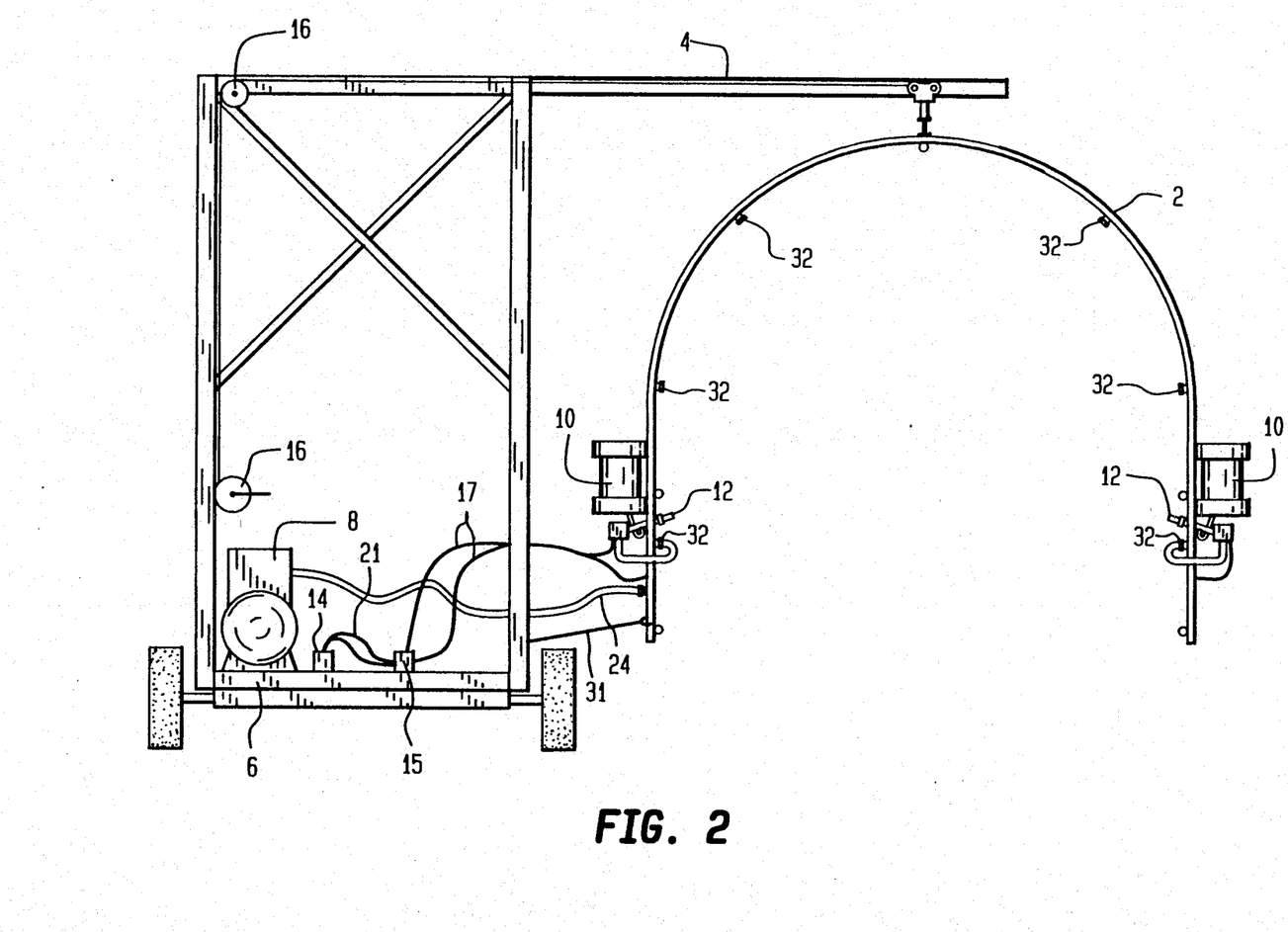
FIG. 2 hereof is an end view of the apparatus of FIG. 1 without the farm tractor.
Figure 3:
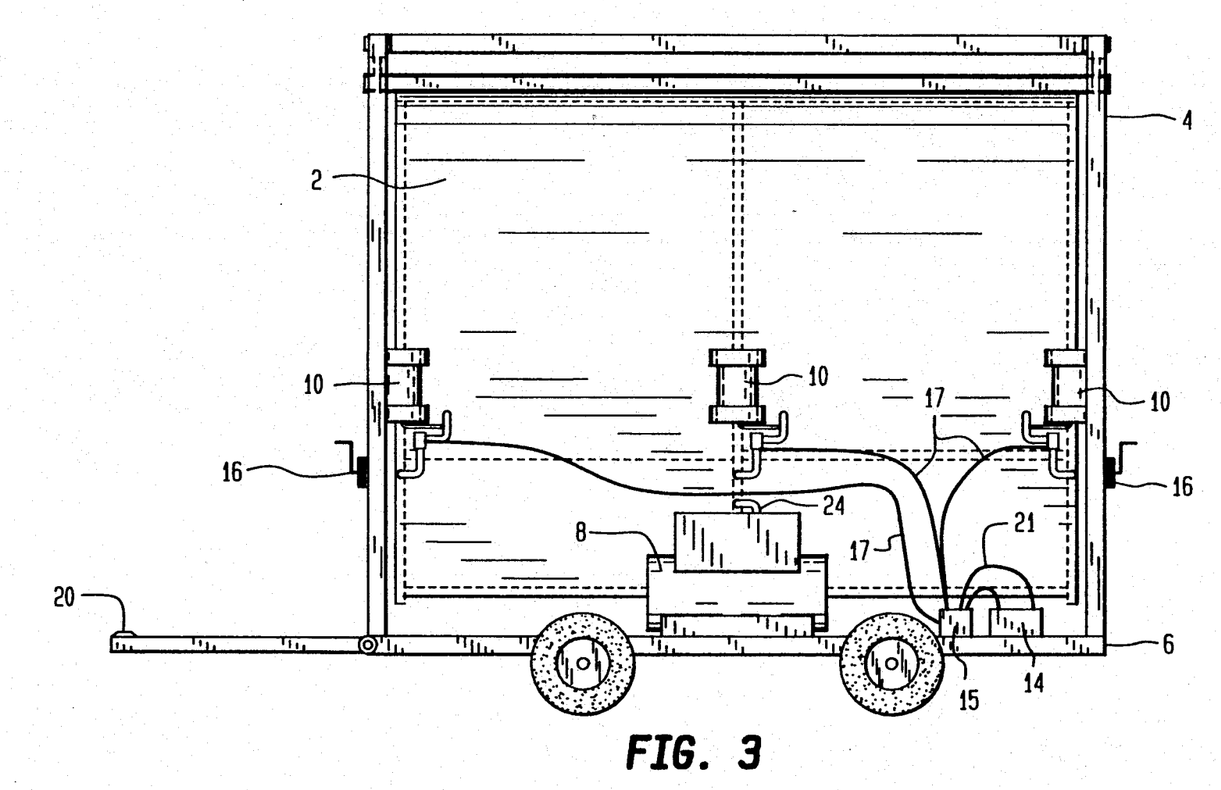
FIG. 3 hereof is a side view of the preferred apparatus of the present invention also illustrated in FIGS. 1 and 2.
Figure 4:
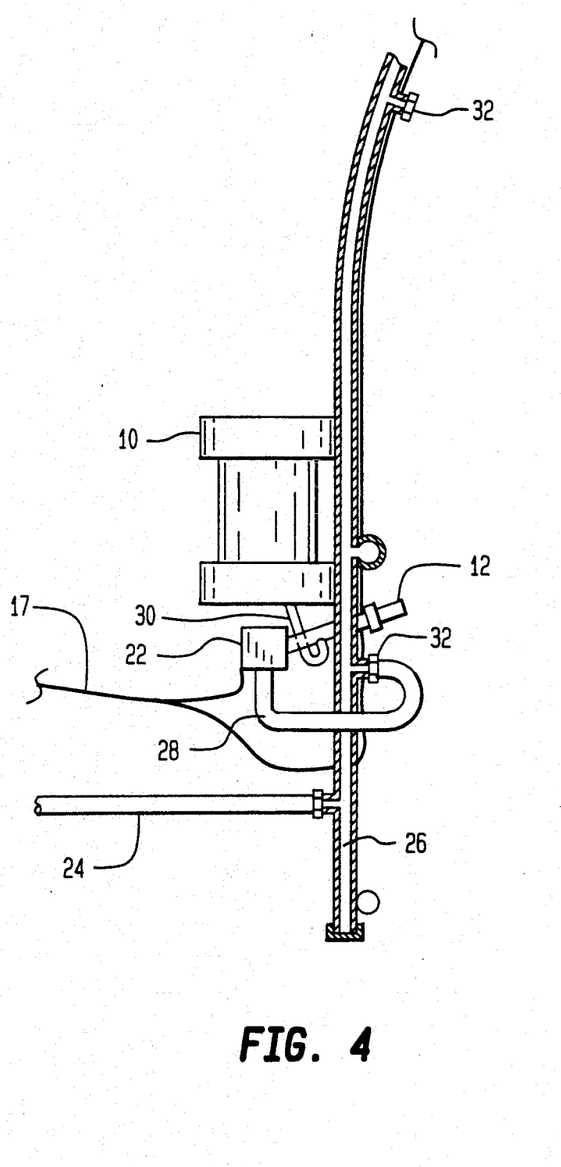
FIG. 4 hereof is a cutaway end view of a preferred apparatus of the present invention showing a container means on the outside of the canopy for containing the material to be applied and a dispersing means projecting into the interior of the canopy.
Figure 5:
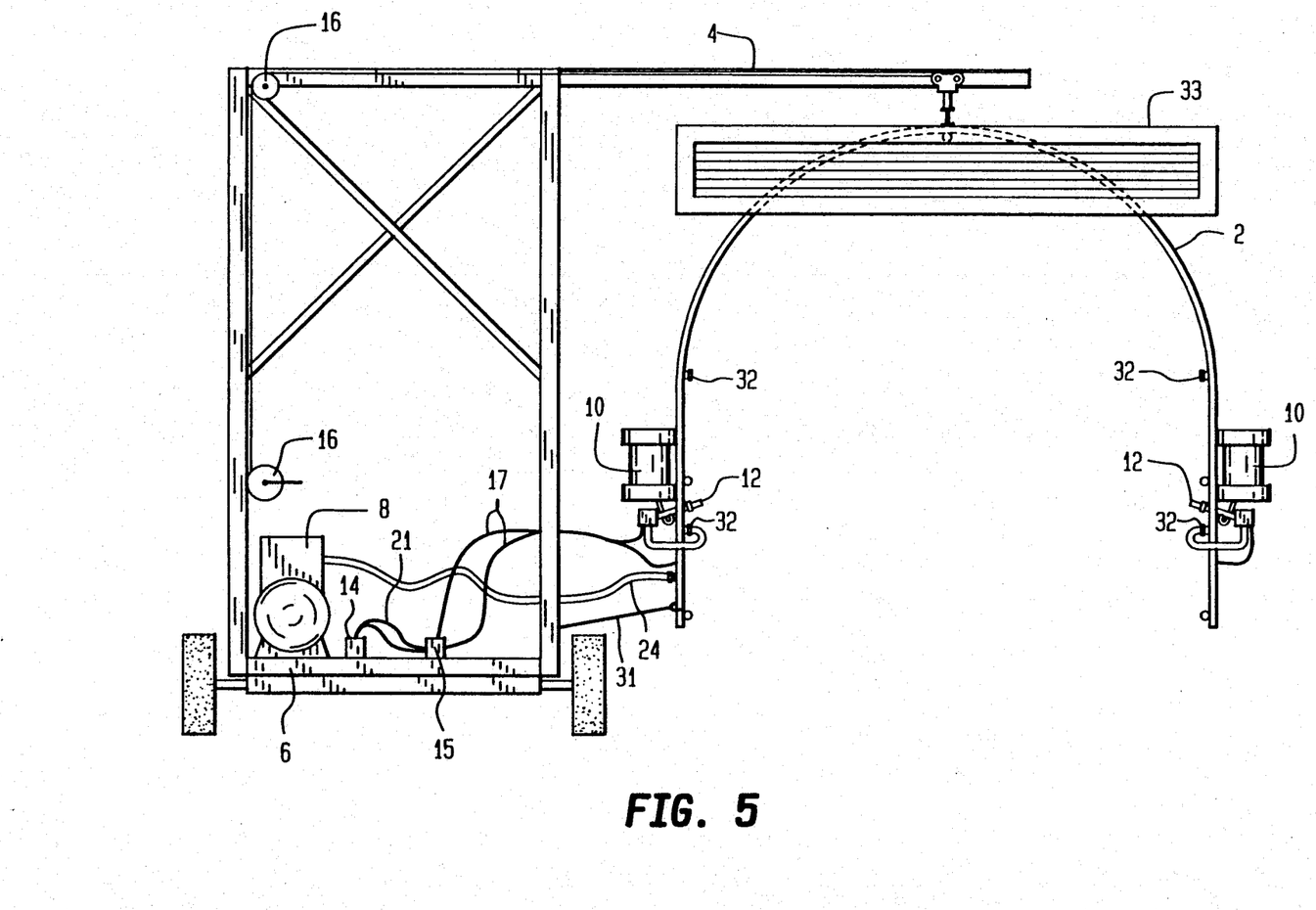
FIG. 5 shows the apparatus of FIG. 2 with the addition of an air curtain.
Figure 6:
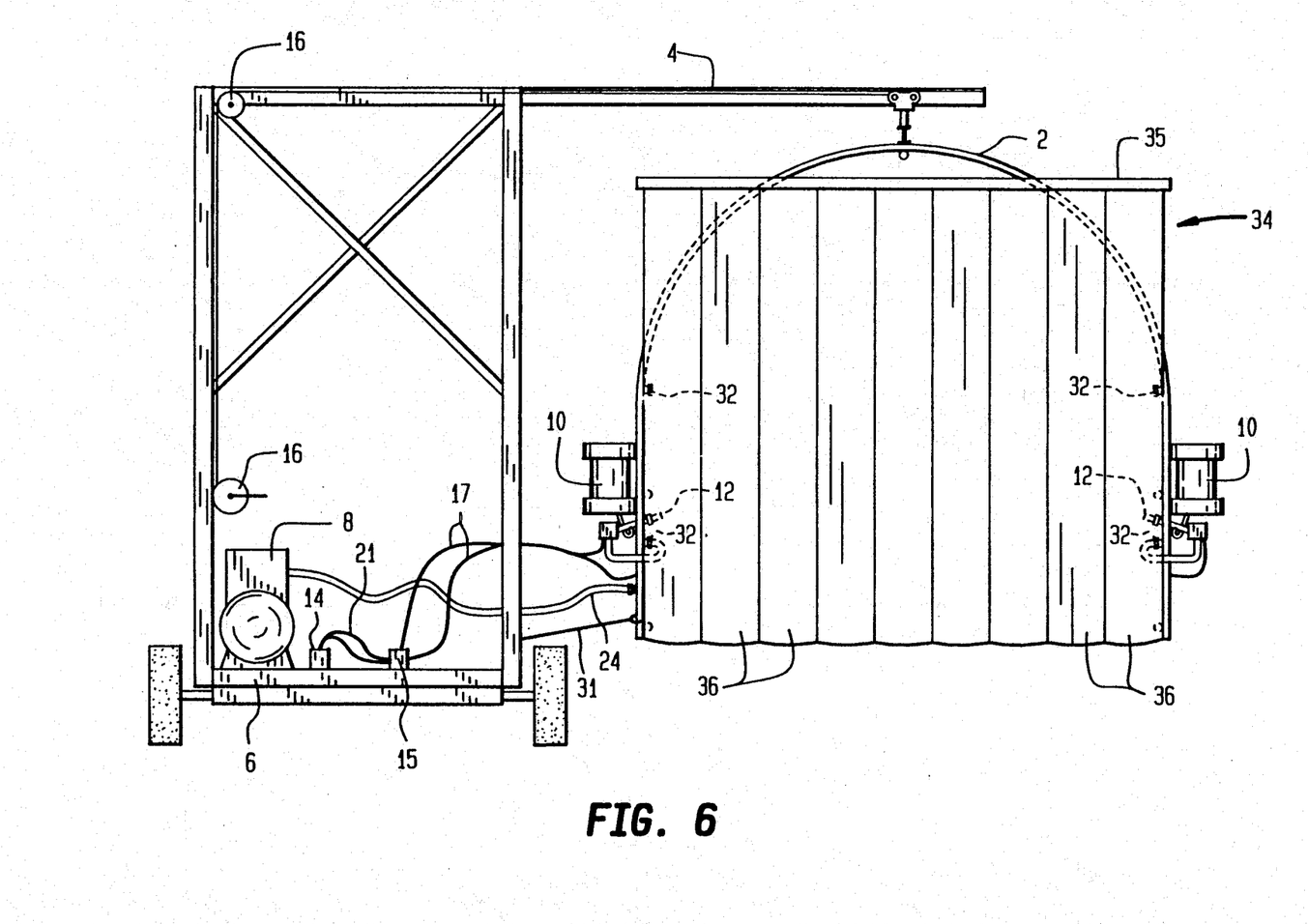
FIG. 6 illustrates the apparatus of FIG. 2 with the addition of a flexible physical barrier.

FIG. 3 is a side view of the preferred apparatus as illustrated in FIGS. 1 and 2. As with FIG. 2 hereof, the parts are identical to those of FIG. 1 and a detailed discussion is not needed. While not absolutely necessary for the basic operation of the apparatus, an attachment means 20 (e.g. trailor hitch) may be provided for attaching the mobile platform to a suitable vehicle, which is preferably a farm tractor. The apparatus of the present invention need not be pulled by a vehicle, but may be pulled by an appropriate farm animal or it can even be pushed by manpower. Of course, it is preferred that the device includes the attachment means 20 for attaching to a suitable vehicle.

FIG. 4 is a partially cutaway end view of a preferred micronizing means of the present invention, showing a container means 10 on the outside of the canopy structure and a dispersion means 12 which passes through the canopy structure and extends in the interior space defined by said canopy. Also shown is a solenoid valve 22 which is electrically connected to electrical switching means 15 (shown in FIGS. 1, 2 and 3), preferably a pulsing means, via wires 17. The present invention may employ conventional solenoid valves such as a Direct Solenoid Pneumatic Valve available from SMC Pneumatics Indianapolis, Ind. Also, the aforementioned electrical switching means may be a conventional relay device such as a Interval Relay (12 volt) available from SSAC, Baldwinsville, N.J. The pulsing of the compressed air, on its way to the dispersion means 12, is preferred because it increases the air turbulence which enhances dispersion of the material. It also causes the particles to become electrostatically charged. A preferred pneumatic conduit means is one which is comprised of an air hose 24 which is connected to the outlet of the air compressor means 8 (shown in FIGS. 1, 2 and 3) and Which is connected to a canopy tubular structural member 26. During operation, the compressed air passes from said air compressor means 8 via air hose 24 to tubular member 26, and then to conduit 28 which is connected to solenoid valve 22. On its way through dispersion means 12 the air siphons material from container means 10 via conduit 30 (connected to both the interior of container means 10 and the passage in dispersion means 12) and discharges the material, in micronized form, into the interior of the canopy.

The foregoing detailed descriptions and examples are given merely for purposes of illustration. Modifications and variations may be made therein without departing from the spirit and scope of the invention.

INDEX OF ELEMENTS DESIGNATED BY A NUMERAL

2 Canopy
4 Supporting Structure
6 Mobile Support Means
8 Air Compressor Means
10 Container Means
12 Dispersion Means
14 Battery
15 Electrical Switching Means
16 Cable and Pulley Means
17 Wires
20 Attachment Means
21 Wires
22 Solenoid Valve
24 Air Hose
26 Tubular Member
28 Conduit
30 Conduit
31 Locking Means
32 Quick Connection Means
33 Air Curtain
34 Flexible Physical Barrier
35 Bar/Rod
36 Strips

What is claimed is:

1. An apparatus comprising:

a canopy defining therein an interior dimensioned to at least partially contain an agricultural commodity;

micronizing means for micronizing material to be applied to said agricultural commodity in said interior of said canopy, including container means for containing material to be applied to said agricultural commodity and dispersion means which is operably connected to said container for receiving said material from said container means and for dispersing said material to said interior of said canopy;

compressor means for compressing air;

pneumatic conduit means, operably connected to both said compressor means and said micronizing means, for conducting said compressed air from said compressor means to said micronizing means;

at least one valve means operably connected to said pneumatic conduit means, for permitting and stopping flow of air through said pneumatic conduit means;

control means, operably connected to said at least one valve means, for controlling opening and closing of said at least one valve means, wherein said control means functions to control repeated opening and closing of said at least one valve means so as to disperse said material in a pulsed manner and thereby enhance distribution of said material; and mobile support means for supporting and transporting all of the aforementioned elements.

2. The apparatus of claim 1 wherein:

said canopy includes a cover and support means for supporting said cover;

and wherein said pneumatic conduit means includes at least one pipe means for both conducting said compressed air and for functioning as at least part of said support means.

3. The apparatus of claim 1 wherein said pneumatic conduit means includes an array of plural quick connection means for connection to said micronizing means.

4. The apparatus of claim 1 wherein said canopy includes a cover, wherein said cover is transparent or translucent.

5. The apparatus of claim 1 wherein said compressor means functions to compress said air to a pressure of about 120 pounds per square inch to about 150 pounds per square inch.

6. The apparatus of claim 1 wherein each said at least one valve means is a solenoid valve, and each said solenoid valve is electrically connected to a battery via an electrical pulsing switching means for permitting pulses of electricity to flow from said battery to each said solenoid valve so that each said solenoid valve opens and closes in a pulsed manner.

7. The apparatus of claim 1 wherein said canopy defines at least one opening, and further including curtain means for deterring escape of said material through said at least one opening.

8. The apparatus of claim 7 wherein said curtain means is selected from the group consisting of an air curtain and a flexible physical barrier.

9. The apparatus of claim 1 further including means connecting said canopy to said mobile support means in a manner which permits said canopy to be held in a first position which is substantially over said mobile support means and to be extended to a position beside said mobile support means.

10. The apparatus of claim 9 further including means to lock said canopy in either its first retracted position or its second extended position.

11. The apparatus of claim 1 wherein said container means contains only dry particulate material.

12. A method for applying a material to an agricultural commodity, said method comprising:
providing an apparatus comprised of: a canopy defining therein an interior dimensioned to at least partially contain an agricultural commodity; micronizing means for micronizing material to be applied to said agricultural commodity in said interior of said canopy, including container means for containing material to be applied to said agricultural commodity and dispersion means which is operably connected to said container means for receiving said material from said container means and for dispersing said material to said interior of said canopy; compressor means for compressing air; pneumatic conduit means, operably connected to both said compressor means and said micronizing means, for conducting said compressed air from said compressor means to said micronizing means; at least one valve means operably connected to said pneumatic conduit means, for permitting and stopping flow of air through said pneumatic conduit means; control means, operably connected to said at least one valve means, for controlling opening and closing of said at least one valve means, wherein said control means functions to control repeated opening and closing of said at least one valve means so as to disperse said material in a pulsed means and, thereby enhance distribution of said material; and mobile support means for supporting and transporting all of the aforementioned elements.

13. The method of claim 12 wherein:
said canopy includes a cover and support means for supporting said cover;
and wherein said pneumatic conduit means includes at least one pipe means for both conducting said compressed air and for functioning as at least part of said support means.

14. The method of claim 12 wherein said pneumatic conduit means includes an array of plural quick connection means for connection to said micronizing means.

15. The method of claim 12 wherein said canopy includes a cover, wherein said cover is transparent or translucent.

16. The method of claim 12 wherein said compressor means functions to compress said air to a pressure of about 120 pounds per square inch to about 150 pounds per square inch.

17. The method of claim 12 wherein each said at least one valve means is a solenoid valve, and each said solenoid valve is electrically connected to a battery via an electrical pulsing switching means for permitting pulses of electricity to flow from said battery to each said solenoid valve so that each said solenoid valve opens and closes in a pulsed manner.

18. The method of claim 12 wherein said canopy defines at least one opening, and further including curtain means for deterring escape of said material through said at least one opening.

19. The method of claim 18 wherein said curtain means is selected from the group consisting of an air curtain and a flexible physical barrier.

20. The method of claim 12 further including means connecting said canopy to said mobile support means in a manner which permits said canopy to be held in a first position which is substantially over said mobile support means and to be extended to a position beside said mobile support means.

21. The method of claim 20 further including means to lock said canopy in either its first retracted position or its second extended position.

22. The method of claim 12 wherein said container means contains only dry particulate material.

23. The method of claim 22 wherein the dry particulate material is selected from the group consisting of dry particulate pesticides, fungicides, fertilizers, biological control agents and growth regulating compounds.

* * * * *